Patented Sept. 25, 1945

2,385,609

UNITED STATES PATENT OFFICE 2,385,609

PROCESS OF POLYMERIZING OLEFINS

Alfred Clark, Grandview Heights, and Richard S. Shutt, Upper Arlington, Ohio, assignors to Battelle Memorial Institute, Columbus, Ohio, a corporation of Ohio No Drawing. Application July 1, 1940,
Serial No. 343,434

7 Claims. (Cl. 260—683.15)

This invention relates to the treatment of normally gaseous olefins to produce liquid polymers which are particularly adapted for use in antiknock motor fuels.

More specifically the invention relates to the polymerization of ethylene or of gaseous mixtures of olefins containing both ethylene and higher olefins into liquid polymers by contacting the gases at elevated temperatures with catalysts comprising a chromite of zinc, copper or cadmium.

In all hydrocarbon oil cracking processes for the production of gasoline there is an incidental concurrent production of fixed gases containing high percentages of olefinic constituents together with paraffins and free hydrogen. The following table lists hydrocarbons which have been definitely identified in gases from the cracking of hydrocarbon oils:

*Hydrocarbons in cracked petroleum gas mixtures*

| | |
|---|---|
| Methane | Butanes |
| Ethane | Butylenes |
| Ethylene | Pentanes |
| Acetylene | Amylenes |
| Propane | Butadienes |
| Propylene | |

The ratio of unsaturated hydrocarbons to paraffins depends to a considerable extent upon the conditions of cracking. High temperature and low pressure cracking processes favor the production of olefins, in particular, ethylene. Since the total production of gases in cracking operations may vary from 5 to 20% by weight of the stock cracked, it is important to utilize the gases and, if possible, to reconvert them into gasoline.

Processes for reconverting into gasoline the gases formed during the cracking of hydrocarbon oils are well known in the art, for catalysts such as phosphoric acid and sulfuric acid have been used for this purpose. It is difficult, however, to polymerize ethylene by using these catalysts under temperature and pressure conditions suitable for polymerizing the higher olefins such as propylene and butylene. Therefore, a greater part of the ethylene present in refinery gases which are subjected to polymerizing action remains in the effluent or waste gases.

The use of copper chromite catalysts has been proposed for the polymerization of di- and tri-olefins present in normally liquid hydrocarbon oils, preferably in the presence of air. Under these conditions the effect of copper chromite catalysts is selective, being confined to the polymerization of di- and tri-olefins to the exclusion of the mono-olefins such as ethylene, propylene and butylene which are not polymerized.

We have made the surprising discovery that ethylene or normally gaseous mixtures of both ethylene and higher olefins may be polymerized into liquid polymers by contacting the gases at elevated temperatures with catalysts comprising a chromite of zinc, copper or cadmium. In this novel process both the ethylene and the higher olefins are polymerized. According to this invention the more chemically reactive constituents of hydrocarbon gas mixtures, such as those produced incidentally to the cracking of heavy petroleum oils for gasoline manufacture, are caused to polymerize more or less selectively to produce liquid fractions of limited boiling range having valuable characteristics from a motor fuel standpoint.

One of the objects of the present invention, therefore, is to improve the art of catalytic polymerization of olefins in cracked gas mixtures through the use of a catalyst capable of efficiently polymerizing ethylene as well as the higher olefin contents of the cracked gas mixtures.

A further object of the invention is to polymerize efficiently cracked petroleum gas mixtures into polymers falling within the gasoline range without substantial loss of the ethylene content of the mixtures.

Another specific object of the invention is to polymerize gaseous olefins containing both ethylene and higher mono-olefins into liquids adapted for use as motor fuels by a gas phase contact process wherein a chromite of zinc, copper or cadmium is used as a catalyst.

Other and further objects of this invention will become apparent to those skilled in the art from the following description and appended claims.

According to the present invention, catalysts consisting of or containing a chromite of zinc, copper or cadmium are used in substantially dry state. Ethylene or gaseous mixtures of ethylene and higher olefins with other hydrocarbons are passed through or over the dry catalysts at elevated temperatures within a range that does not substantially exceed 600° C., preferably under superatmospheric pressure. The broad temperature range in which the benefits of our invention may be realized is from 200° to 600° C., while the preferred range is from 350° to 450° C. Too low temperatures retard the polymerization reaction unduly, while too high temperatures tend to promote cracking rather than polymerization.

The chromite catalysts used are typified by the zinc chromite catalyst which may consist of zinc oxide and chromic acid anhydride mixed in any desired proportions and subsequently partially reduced from the chromate to the chromite state. An initial mixture containing a molar ratio of zinc oxide to chromic acid anhydride greater than 1 is preferred. The zinc chromite catalyst is preferably employed in granular or pellet form.

The chromite catalyst may be prepared in any specific manner now known to the art. For instance, it may be prepared by passing a reducing gas over a chromate at elevated temperatures. In the preferred form of our invention, we generate a zinc chromite catalyst in the catalyst chamber or reaction vessel by flowing hydrogen through or over zinc chromate before passing olefin gases over and through the catalyst. Alternately, we may utilize the reducing properties of the olefin-containing gases themselves and pass these gases directly over the zinc chromate to form the chromite catalyst. Other methods may also be used to form the chromite catalyst, for instance, calcination of the chromate, or fusion of chromous oxide with the oxides or hydroxides of zinc, copper or cadmium. It is also possible to use various catalytic promoters with our catalysts for the polymerization of gases containing both ethylene and higher mono-olefins. Such promoters are known to the art and may be utilized in a conventional manner.

Gaseous hydrocarbon mixtures containing ethylene and higher olefins adapted for polymerization into liquid motor fuels according to this invention may also be derived by dehydration of the corresponding alcohols or from other sources such as naturally occurring gases containing 2 to 4 carbon olefins. The concentration of olefins in natural gases can be increased by catalytic dehydrogenation or cracking. Refining gases containing 2 to 4 carbon olefins are also desirable starting materials.

Good yields are obtainable by polymerization at elevated pressures exceeding 200 pounds per square inch and preferably ranging within values on the order of 500 to 1500 pounds per square inch. Higher pressures make possible the use of lower temperatures. It should be understood, however, that it is possible to obtain some benefit from our invention even at atmospheric pressure although better results are obtained under the conditions outlined hereinabove. Also, if economically desirable, pressures even higher than 1500 pounds per square inch may be used if the other conditions are adjusted so as to maintain the unpolymerized material in the gaseous state while passing over the catalyst.

The heating required for carrying out the polymerization is usually not very great since the reaction is somewhat exothermic. When the olefin concentration of the feed stock is very high, it may be necessary to cool the reaction chamber so as to maintain the desired temperatures.

The chromite catalysts may suffer a loss of activity after prolonged use, but can then be regenerated in situ by passing oxygen or oxygen-containing gases over the catalysts at elevated temperatures. The oxidized catalyst is then reduced as disclosed hereinabove.

The following examples illustrate the effectiveness of chromite catalysts for the polymerization both of ethylene and other olefins. It should be understood that the invention is not limited to the details given in the following examples but that these examples are merely intended to illustrate preferred embodiments of the invention:

EXAMPLE I

A zinc chromite catalyst was prepared by adding 10 parts by weight of chromic acid anhydride to a slurry of 24 parts by weight of zinc oxide in 40 parts by weight of distilled water. The mixture was stirred for 1 hour in order to produce a homogeneous thick paste. The paste was then dried in an oven over night at 110° C. and the dried mass was broken into small lumps. The zinc chromate thus formed was reduced at 350° C. in situ in the reaction chamber with hydrogen at atmospheric pressures, to produce zinc chromite.

Tank ethylene (99% purity) was fed into a gas holder and then compressed into a high pressure storage bottle to a pressure in excess of 500 lbs. per square inch. The catalyst chamber or reaction chamber was heated slowly to 385° C. and ethylene was flowed through the chamber at atmospheric pressure. When the temperature of the catalyst chamber reached 385° C. the pressure was built up to 500 lbs. per square inch and the rate of flow of ethylene from the storage bottle was adjusted to 18 cubic feet per hour per pound of catalyst. Liquid polymers were drawn off at intervals from the product receiver. The off gases were analyzed for their olefin content. With an inlet velocity of 18 cubic feet per hour per pound of catalyst, a 60% conversion of ethylene to liquid polymers per pass was obtained. The off gases contained 96 to 98% olefins and were suitable for recirculation.

The catalyst showed no decrease in activity after 40 hours of continuous use. The following table gives some of the properties of the polymers obtained by the process:

*Properties of ethylene polymers*

| | |
|---|---|
| Octane No. (A. S. T. M.) | 71.9 |
| Vapor pressure at 100° F. lbs. per square inch | 2.25 |
| Unsaturated hydrocarbons | 8.5% |
| Color of distilled sample | Clear straw yellow |
| Boiling below 400° F. | 86.5% |
| Specific gravity | 0.739 |
| 50% boiling point | 280° F. |
| Average molecular weight | 120 |

EXAMPLE II

Zinc chromate, prepared, as in Example I, from chromic acid anhydride and zinc oxide, was dried, broken into small lumps and placed in the reaction chamber. The chamber was heated to about 350° C. and a cracked petroleum gas mixture of the following composition was circulated through the chamber:

| | Per cent |
|---|---|
| Hydrogen | 4 |
| Methane | 22.5 |
| Ethylene | 20.8 |
| Propylene | 13.2 |
| Propane | 27.0 |
| Ethane | 12.5 |

The gases were passed through the chamber until the zinc chromate was reduced to zinc chromite.

The reaction chamber was then heated to 385° C. and the pressure therein increased to 1500 lbs. per square inch. The gas mixture was conducted into the chamber at the rate of 18 cubic feet per hour per pound of catalyst. The conversion per pass of the gas mixture to liquid polymers based on the olefin content of the mixture was approximately 40%. The ratio of ethylene to propylene polymerized to liquid products was approximately 3 to 1. The following table gives the properties of the liquid polymers produced:

*Properties of ethylene-propylene polymers*

Color of distilled sample _____Clear straw yellow
Boiling below 400° F. _____ 85%
Specific gravity _____ 0.750
50% boiling point _____ 311° F.
Average molecular weight _____ 132

EXAMPLE III

Using the catalyst described in Example I, a run was made on a gas of the following composition:

| | Per cent |
|---|---|
| Hydrogen | 4 |
| Methane | 22.5 |
| Ethylene | 6 |
| Ethane | 17.5 |
| Propylene | 11.0 |
| Propane | 27 |
| Butylenes | 4 |
| Butane | 6 |
| Carbon monoxide and nitrogen | 2 |

The gas mixture was conducted to the catalyst chamber or reactor at the rate of 18 cubic feet per hour per pound of catalyst and the catalyst was heated to 385° C. The reactor was maintained under a pressure of 1500 lbs. per square inch.

The conversion per pass, based on the olefinic content of the initial gas was approximately 40%. The ratio of ethylene to propylene and butylenes polymerized to liquids was approximately 1 to 2. Properties of these polymers were very similar to those of the preceding example.

The advantages of our invention are further illustrated by the data listed in the following table:

*Comparison of catalysts of this invention and certain prior art catalysts*

| Variable | Gases having a high $\frac{C_2H_4}{C_3H_6 \text{ plus } C_4H_8}$ ratio | | Gases having a low $\frac{C_2H_4}{C_3H_6 \text{ plus } C_4H_8}$ ratio | | | |
|---|---|---|---|---|---|---|
| | "Solid" phosphoric acid catalyst | Zinc chromite catalyst | Zinc chromite catalyst | Copper chromite catalyst | "Solid" phosphoric acid catalyst | "Solid" phosphoric acid catalyst |
| Pressure, p. s. i. | 200 | 1,500 | 1,500 | 1,500 | 1,500 | 200 |
| Temp. °C | 230 | 385 | 385 | 300–350 | 385 | 230 |
| Gas inlet, cu. ft./hr./# catalyst | 1.83 | 18.0 | 15.5 | 18.7 | 10.2 | 2.3 |
| Gas inlet, percent $C_2H_4$ | 20 | 20 | 8.0 | 6.0 | 8.0 | 8.0 |
| Gas inlet, percent $C_3H_6$ plus $C_4H_8$ | 12 | 12 | 14 | 13.2 | 14.0 | 14.0 |
| Percent ethylene polymerized | 0 | 36 | 24 | 26 | 0 | 0 |
| Percent higher olefins polymerized | 66 | 31 | 48 | 43 | 45 | 55 |
| Conversion of all olefins to gasoline, percent | 25 | 35 | 40 | 37.5 | 29.0 | 35.0 |

The ability of our catalysts to polymerize ethylene as well as the higher olefins in mixtures of hydrocarbon gases is readily seen. As pointed out hereinabove, this fact is of great importance, for instance, in the utilization of refinery gases where presently used catalysts fail to polymerize ethylene which is consequently not included in the gasoline fraction recovered.

From the above description it is to be understood that this invention relates to the conversion of ethylene or of gaseous mixtures containing both ethylene and higher normally gaseous mono-olefins into liquid polymers with the aid of a catalyst selected from the group consisting of the chromites of zinc, copper and cadmium. This catalyst may be prepared by the reduction of a chromate with hydrogen or with an olefinic gas mixture or by any other method suitable for the production of chromites. If desired, the catalyst may be produced in situ. If the catalyst suffers a loss of activity, it can be revivified by passing oxygen or oxygen-containing gases over and through the catalyst and subsequently reducing the oxidized catalyst back to the chromite form.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. The process of polymerizing a normally gaseous mixture containing ethylene, propylene and butylene such as may be derived from cracked petroleum, which comprises passing said mixture through a reactor in contact with a catalyst selected from the group consisting of the chromites of zinc, copper and cadmium at temperatures between 200° and 600° C. and under pressures of about 200 to 1500 pounds per square inch to polymerize simultaneously said ethylene, propylene and butylene.

2. The process of polymerizing a normally gaseous mixture containing ethylene, propylene and butylene such as may be derived from cracked petroleum, which comprises passing said mixture through a reactor in contact with a zinc chromite catalyst at temperatures between 200° and 600° C. and under pressures of about 200 to 1500 pounds per square inch to polymerize simultaneously said ethylene, propylene and butylene.

3. The process of polymerizing a normally gaseous mixture containing ethylene, propylene and butylene such as may be derived from cracked petroleum, which comprises passing said mixture through a reactor in contact with a zinc chromite catalyst at temperatures between 350° and 450° C. and under pressures of about 500 to 1500 pounds per square inch to polymerize simultaneously said ethylene, propylene and butylene.

4. The process of polymerizing a normally gaseous mixture containing ethylene, propylene and butylene such as may be derived from cracked petroleum, which comprises passing said mixture through a reactor in contact with a copper chromite catalyst at temperatures between 200° and 600° C. and under pressures of about 200 to 1500 pounds per square inch to polymerize simultaneously said ethylene, propylene and butylene.

5. The process of polymerizing a normally gaseous mixture containing ethylene, propylene and butylene such as may be derived from cracked petroleum, which comprises passing said mixture through a reactor in contact with a copper chromite catalyst at temperatures between 350° and 450° C. and under pressures of about 500 to 1500 pounds per square inch to polymerize simultaneously said ethylene, propylene and butylene.

6. The process of polymerizing a normally gaseous mixture containing ethylene, propylene and butylene such as may be derived from cracked petroleum, which comprises passing said mixture through a reactor in contact with a cadmium chromite catalyst at temperatures between 200° and 600° C. and under pressures of about 200 to 1500 pounds per square inch to polymerize simultaneously said ethylene, propylene and butylene.

7. The process of polymerizing a normally gaseous mixture containing ethylene, propylene and butylene such as may be derived from cracked petroleum, which comprises passing said mixture through a reactor in contact with a cadmium chromite catalyst at temperatures between 350° and 450° C. and under pressures of about 500 to 1500 pounds per square inch to polymerize simultaneously said ethylene, propylene and butylene.

ALFRED CLARK.
RICHARD S. SHUTT.